United States Patent
Nelson et al.

(10) Patent No.: US 12,441,245 B2
(45) Date of Patent: Oct. 14, 2025

(54) UNIVERSAL SENSOR SYSTEM FOR AUTO DIMMING CONTROL FOR DIFFERENT SPECTRAL OUTPUTS

(71) Applicant: GENTEX CORPORATION, Zeeland, MI (US)

(72) Inventors: Barry K. Nelson, Howard City, MI (US); John S. Anderson, Holland, MI (US); Mario F. Saenger Nayver, Holland, MI (US); Steven M. Childs, Grand Haven, MI (US); George A. Neuman, Holland, MI (US); Henry A. Luten, Zeeland, MI (US)

(73) Assignee: GENTEX CORPORATION, Zeeland, MI (US)

(*) Notice: Subject to any disclaimer, the term of this patent is extended or adjusted under 35 U.S.C. 154(b) by 581 days.

(21) Appl. No.: 17/886,834

(22) Filed: Aug. 12, 2022

(65) Prior Publication Data

US 2023/0054465 A1    Feb. 23, 2023

Related U.S. Application Data

(60) Provisional application No. 63/260,416, filed on Aug. 19, 2021.

(51) Int. Cl.
*B60R 1/08*    (2006.01)
*B32B 9/04*    (2006.01)
(Continued)

(52) U.S. Cl.
CPC .............. *B60R 1/088* (2013.01); *B32B 9/04* (2013.01); *B60R 1/12* (2013.01); *G01J 1/0488* (2013.01);
(Continued)

(58) Field of Classification Search
CPC ... B60R 1/088; B60R 1/12; B60R 2001/1223; B32B 9/04; B32B 2250/05;
(Continued)

(56) References Cited

U.S. PATENT DOCUMENTS

2018/0012922 A1    1/2018  Sticherling
2018/0158435 A1*   6/2018  Nelson ...................... G01J 1/46
2019/0339432 A1    11/2019 Du et al.

FOREIGN PATENT DOCUMENTS

EP    0522850    *  9/1992  ............... G02B 1/10
EP    0522850 A1    1/1993
EP    0725286 A1    8/1996

OTHER PUBLICATIONS

International Search Report dated Nov. 29, 2022, for corresponding PCT application No. PCT/US2022/040172, 3 pages.
(Continued)

*Primary Examiner* — James C. Jones
(74) *Attorney, Agent, or Firm* — Price Heneveld LLP; Brian James Brewer

(57) ABSTRACT

A rearview system may comprise a light sensor assembly having: a photosensor operable to detect light and generate a signal based, at least in part, on the detected light; a dichroic filter in optical communication with the photosensor and operable to filter light; and a rearview assembly having an electro-optic element may comprise an electro-optic medium and operable to variably change the amount of light passing through the electro-optic medium based, at least in part, on the signal. The dichroic filter may be configured to substantially inhibit light having a wavelength of less than 400 nm or greater than 650 nm from transmitting therethrough.

14 Claims, 5 Drawing Sheets

(51) Int. Cl.
  *B60R 1/12* (2006.01)
  *G01J 1/04* (2006.01)
  *G01J 1/42* (2006.01)
  *G02B 1/02* (2006.01)
  *G02F 1/01* (2006.01)
  *G02B 5/28* (2006.01)

(52) U.S. Cl.
  CPC .............. *G01J 1/4204* (2013.01); *G02B 1/02* (2013.01); *G02F 1/0121* (2013.01); *B32B 2250/05* (2013.01); *B32B 2250/42* (2013.01); *B32B 2307/418* (2013.01); *B32B 2551/00* (2013.01); *B60R 2001/1223* (2013.01); *G02B 5/281* (2013.01); *G02F 2203/48* (2013.01)

(58) Field of Classification Search
  CPC .......... B32B 2250/42; B32B 2307/418; B32B 2551/00; G01J 1/0488; G01J 1/4204; G01J 1/0403; G01J 1/0407; G01J 1/0448; G02B 1/02; G02B 5/281; G02B 5/285; G02F 1/0121; G02F 2203/48
  See application file for complete search history.

(56) References Cited

OTHER PUBLICATIONS

Written Opinion dated Nov. 29, 2022, for corresponding PCT application No. PCT/US2022/040172, 5 pages.

\* cited by examiner

UNIVERSAL SENSOR SYSTEM FOR AUTO DIMMING CONTROL FOR DIFFERENT SPECTRAL OUTPUTS

CROSS REFERENCE TO RELATED APPLICATIONS

This application claims the benefit of and priority to U.S. Provisional Patent Application No. 63/260,416, filed on Aug. 19, 2021, entitled "Universal Sensor System for Auto Dimming Control for Different Spectral Outputs," the entire disclosure of which is hereby incorporated herein by reference.

FIELD OF THE DISCLOSURE

This disclosure relates generally to a light sensor associated with a rearview mirror assembly and in particular to a glare sensor of an electro-optic rearview mirror assembly.

BACKGROUND

Electro-optic rearview assemblies for vehicles may be configured to dim or clear based, at least in part, on the amount of glare detected. The glare generally may originate in headlights of vehicles approaching from behind the vehicle in question. A sensor system may be configured to detect the glare and dim or clear the electro-optic assembly based on glare levels detected.

However, advances in headlight systems have introduced new glare sources. For example, different types of automotive headlamps may have different spectral outputs. Current glare control system were not designed to compensate for the new automotive headlamps and may undervalue the new glare sources. The intensity of light at different wavelengths emitted by light emitting diode (LED), high intensity discharge (HID), and Halogen headlamps may interact with a sensor system in a way that leads to different interpretations of glare by the sensor. Depending on a bias of an electro-optic rearview assembly, the triggering and/or response of the dimming function may be offset by different spectral outputs of different types of headlights, and the sensor may not trigger the electro-optic assembly to dim at the proper glare level, thereby resulting in undesirable glare to the operator's eye. This may be particularly problematic in the context of LED and HID headlights. Many current electro-optic rearview assemblies and associated glare sensors were developed prior to the commercial introduction of these types of headlights and are not oriented to the spectral outputs of these headlights.

In addition, sensors, particularly those using silicon, are often added to rearview assemblies. The sensors may be sensitive to infrared (IR) light and thus may require coatings designed to block IR light. This reduces or prevents nuisance dimming of the mirror system. Systems having these sensors may be biased to take into account glare from halogen lights rather than other types of lights, as halogen lights were the primary source of glare in rearview assemblies when the system was developed. The coatings may inhibit long-wavelength light (over 750 nm) from reaching the sensors. In some cases, the IR-blocking coatings may also inhibit shorter wavelengths of light from reaching the sensor. For example, the coating may inhibit light having wavelengths greater than 650 nm.

Because of the different spectral outputs of the newer headlights, the amount of dimming of the electro-optic element in response to glare may be insufficient and the trigger point for the dimming may be too high to cause the dimming to take place at the appropriate glare level as desired. This may result in more glare to the operator of the vehicle. In addition, newer types of coatings may enhance any spectral mismatch from different headlight types and their interaction with the sensor, resulting in undesirable glare.

SUMMARY

According to an aspect, a rearview system may comprise a light sensor assembly having: a photosensor operable to detect light and generate a signal based, at least in part, on the detected light; a dichroic filter in optical communication with the photosensor and operable to filter light; and a rearview assembly having an electro-optic element may comprise an electro-optic medium and operable to variably change the amount of light passing through the electro-optic medium based, at least in part, on the signal. The dichroic filter may be configured to substantially inhibit light having a wavelength of greater than a predetermined wavelength from transmitting therethrough.

The dichroic filter may be configured to substantially inhibit light having a wavelength of greater than 650 nm from transmitting therethrough. The dichroic filter may comprise a plurality of filter layers. The filter layers comprise a plurality of niobium oxide layers and a plurality of silicon dioxide layers and wherein the niobium oxide layers alternate with the silicon dioxide layers. The dichroic filter may comprise at least 50 layers, wherein at least 25 of the filter layers may be silicon dioxide layers and at least 25 of the layers may be niobium oxide layers. The dichroic filter may comprise a first portion capable of substantially inhibiting the passage of light having a wavelength within a first range of wavelengths through the dichroic filter and a second portion capable of substantially inhibiting the passage of light having a wavelength within a second range of wavelengths through the dichroic filter. The range of thicknesses of the silicon dioxide layers in the first portion may be generally different from the range of thicknesses of the silicon dioxide layers in the second portion and the range of thicknesses of the niobium oxide layers in the first portion may be generally different from the range of thicknesses of the niobium oxide layers in the second portion The first range and the second range may be at least partially outside the visible light spectrum. The dichroic filter may be configured to generate sensor responses similar to the response of a human eye. The dichroic filter may be configured to substantially inhibit light having wavelengths below 400 nm.

DETAILED DESCRIPTION

Figure 1:
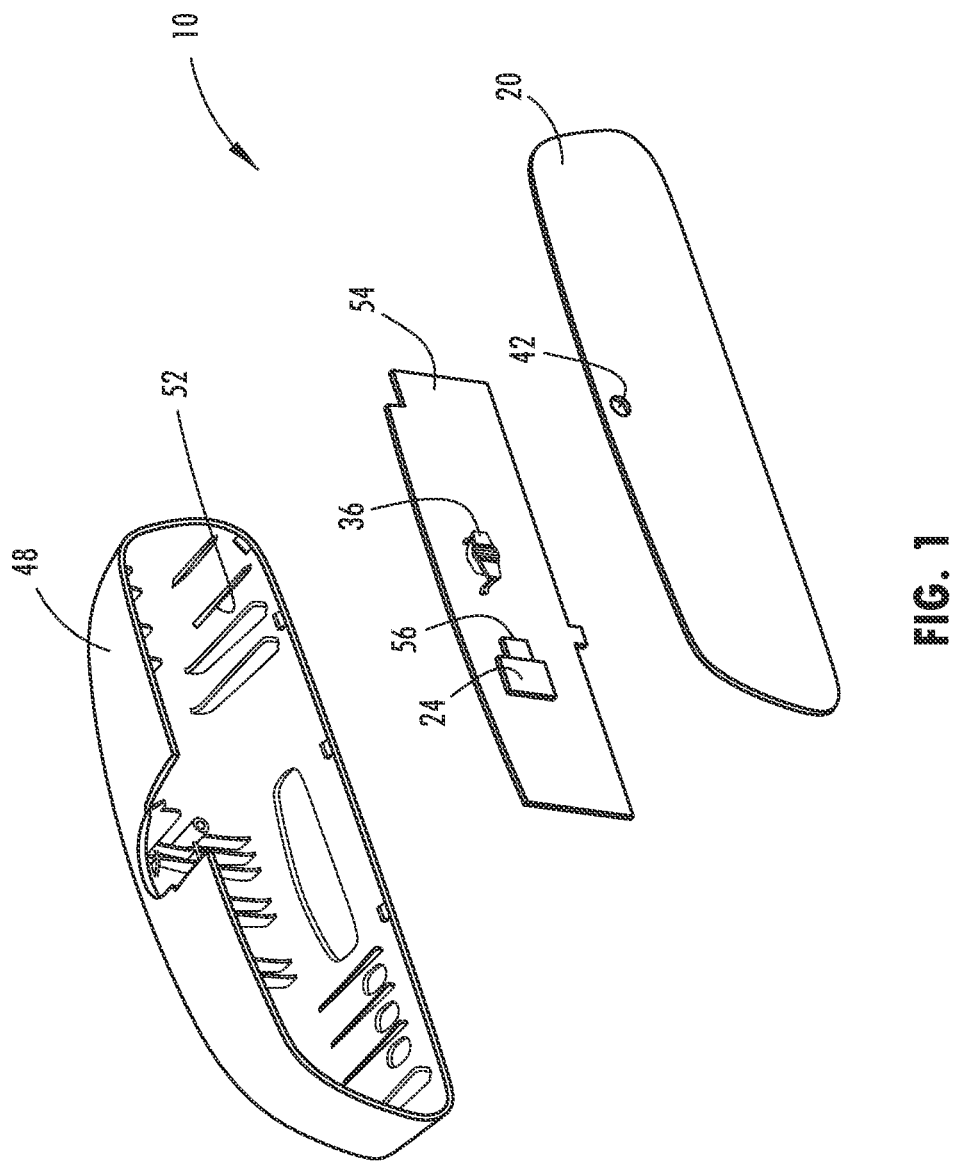
FIG. 1 illustrates an exploded view of a rearview assembly in accordance with this disclosure.

Referring now to FIG. 1, reference numeral 10 generally designates a rearview assembly for a vehicle in accordance with this disclosure. In some embodiments, rearview assembly 10 may be designed for mounting to a windshield or a roof of the vehicle (not shown), or for mounting to an exterior surface of a vehicle. Rearview assembly 10 may be configured to provide and for providing images of a scene to the rear of the vehicle to the operator.

Figure 2:
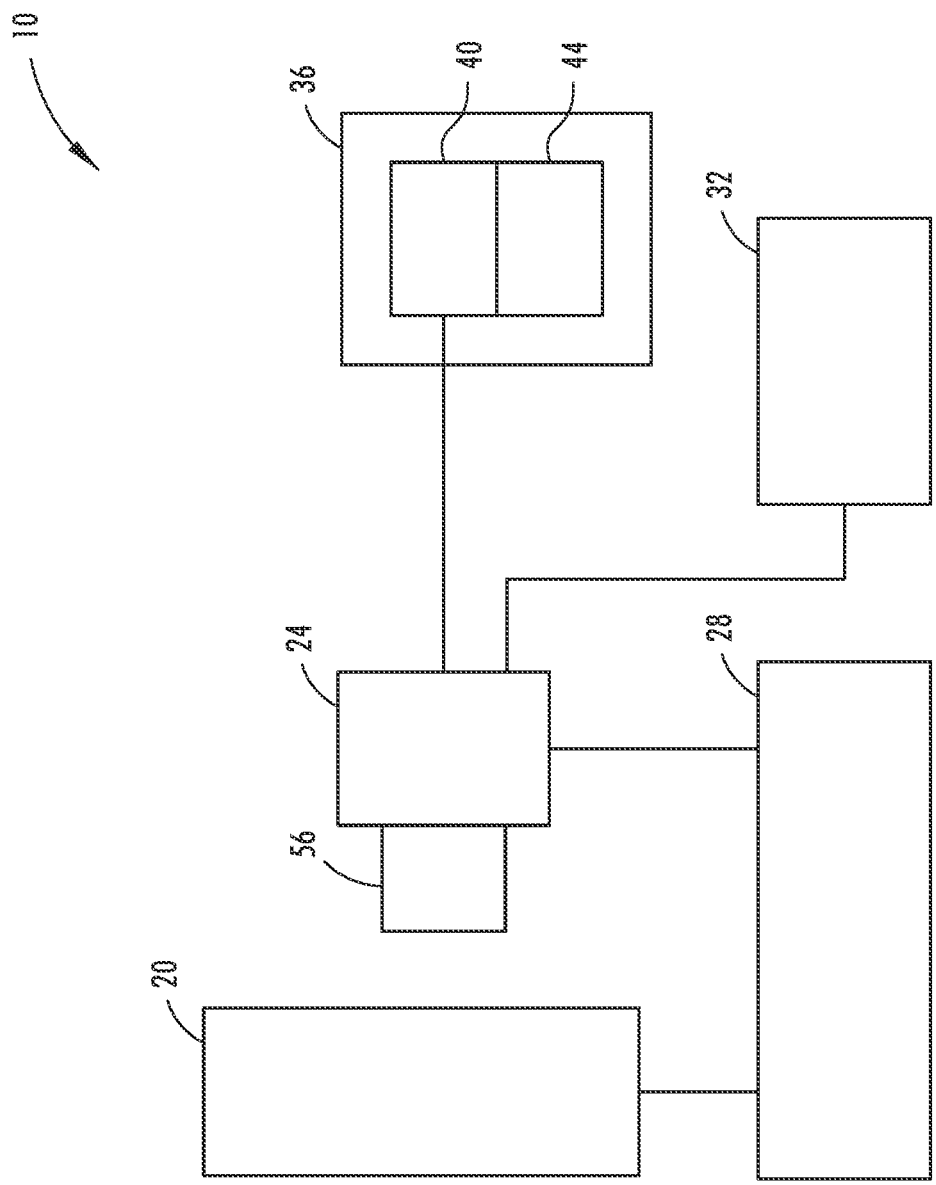
FIG. 2 illustrates a block diagram of the rearview assembly of FIG. 1.

As shown in FIG. 2, rearview assembly 10 may comprise an electro-optic (EO) element 20, a processor 24, a controller 28, at least one ambient light sensor 32, and a light sensor assembly 36 comprising at least one rear-facing glare sensor 40, and a filter 44 associated with each of the at least one rear-facing glare sensors 40. Rearview assembly 10 may be capable of reducing the amount of glare from trailing vehicles that reaches the operator.

Referring again to FIG. 1, rearview assembly 10 may include a housing 48 defining an opening 52. EO element 20 may be disposed over opening of housing 48 and be configured to selectively darken to reduce glare upon the receipt of appropriate inputs. The darkening of EO element 20 may occur when ambient light levels as determined by ambient light sensor 32 indicate it is dark or twilight out.

To determine whether it is dark or twilight out, the at least one ambient light sensor 32 may be positioned to receive ambient light from exterior to the vehicle. In some embodiments, at least one ambient light sensor 32 may be a front-facing sensor, although other positions and orientations are within the contemplated scope of this disclosure. Ambient light sensor 32 may be configured to produce an ambient light signal indicating the amount of ambient light incident on ambient light sensor 32. The at least one ambient light sensor 32 may be in communication with processor 24 and may be configured to transmit inputs to processor 24. Processor 24 may be configured to receive ambient light signal from ambient light sensor 32 and to determine an ambient light level.

Processor 24 may be configured to transmit an input to controller 28 indicating ambient light levels. Controller 28 may be configured to cause EO element 20 to switch between a daytime mode and a nighttime mode based on the inputs received by controller 28. In the daytime mode, EO element 20 may be in a substantially clear state, whereas in the nighttime mode, controller 28 may be configured to selectively cause EO element 20 to darken.

Figure 3:
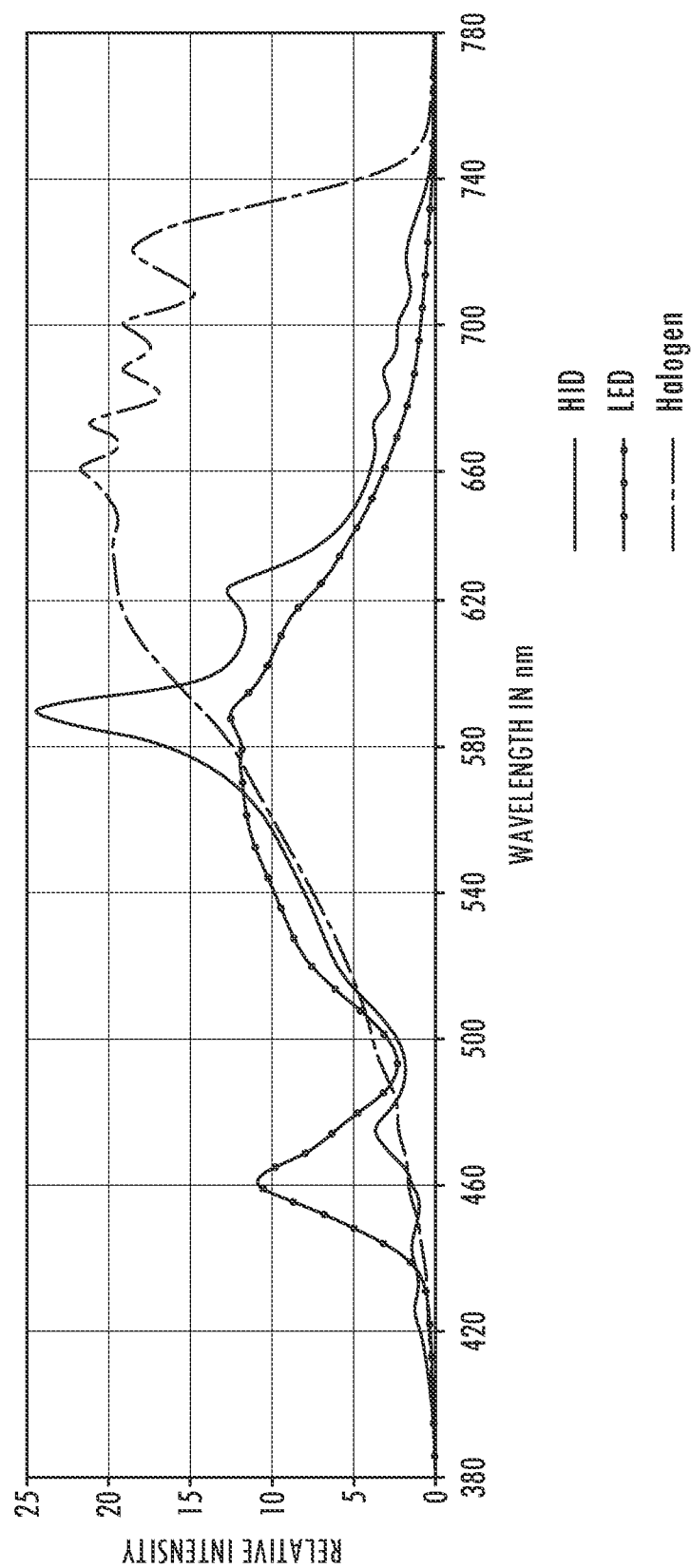
FIG. 3 is a graph that illustrates different amounts of glare, shown as the areas under the curves, for different types of headlights.

The point at which darkening starts, referred to herein as the trigger point of EO element 20, when may be influenced by how dark it is as measured by the ambient light sensor 32. The trigger point may additionally, or alternatively, be based on a threshold glare level detected by the at least one glare sensor 40. Glare sensor 40 may comprise a photosensor operable to detect light and generate a signal based, at least in part, on the detected light. Different types of headlights, such as, for example, halogen, high intensity discharge (HID), and light emitting diode (LED) may produce different spectral outputs, as shown in FIG. 3. The intensity of light at different wavelengths emitted by HID, LED, and Halogen headlamps may interact with a sensor system in a way that leads to different interpretations of glare and thus, different amounts of glare reaching the driver's eye. FIG. 3 illustrates the relativity intensities of different wavelengths produced by different types of headlights, including HID lights, LED headlights, and halogen headlights. The different spectral outputs of the different types of headlights may result in different trigger points and different responses for the different headlight types. The areas under the curves for each of the different headlight types in FIG. 3 represent the relative amount of glare in rearview assembly 10 as perceived by the vehicle operator. The intensity of the received light at different wavelengths emitted by HID, LED, and Halogen headlamps may interact with glare sensor 40 in a way that leads to different interpretations of glare. This may result in glare to the operator's eye. Based on the individual light spectra of the various light sources in headlight systems, a more equal eye-weighted light detection for these light sources may be desirable.

The human eye responds in particular ways to light and colors. For example, human eyes may not be equally sensitive to light over the range of the visual spectrum and may be generally more sensitive in certain parts of the spectrum than they are in others. Different types of headlights may produce light in different portions of the spectrum, including the visible and the infrared portions of the spectrum. Current glare sensors 40 may not have the same sensitivity to different wavelengths that human eyes do and therefore may sense glare differently than human eyes.

Adapting the glare sensor response to control the amount of light reflected to the operator's eyes by increasing or decreasing the reflectance of rearview assembly 10 may enable the perceived intensity of the different headlights to be more equal. Accordingly, filter 44 may be disposed between glare sensor 40 and the light source to change the trigger point and/or response of EO element 20, thereby mitigating the glare reaching the operator's eye. Filter 44 may cause glare sensor 40 to more closely mimic the human eye regarding how glare is perceived and the desirability of darkening EO element 20 based on perceived glare.

Filter 44 may be in optical communication with glare sensor 40. Filter 44 may be placed before or incorporated on or within glare sensor 40. In some embodiments, filter 44 may be disposed on a surface of glare sensor 40 such that light must pass through filter 44 prior to reaching glare sensor 40. In some embodiments, filter 44 may be incorporated within glare sensor 40. In some embodiments, filter 44 may be a freestanding filter 44 disposed in a path between a light source and glare sensor 40, wherein light from the light source would pass through filter 44 prior to reaching glare sensor 40. Filter 44 may be on a coated substrate in proximity to sensor.

In some embodiments, filter 44 may be configured to reduce or eliminate light sources having wavelengths in a range outside at least one desired range of wavelengths. Filter 44 may be configured to attenuate certain portions of the spectrum that may include visible light, infrared, and ultraviolet radiation such that light striking the at least one glare sensor 40 may more closely approximate the response of the human eye. In some embodiments, filter 44 may be configured to attenuate light having wavelengths within two or more portions of the spectrum.

Filter 44 may be configured to transmit light in the spectral range of human vision and to reduce or block light outside this range. This may result in a better correlation of glare detection and human perception of glare independent of the type of light source (incandescent, high intensity discharge, neon tubes, white or colored LEDs). This may enable filter 44 to make the sensitivity of glare sensor 40 similar to the sensitivity of a human eye and thus the response of glare sensor 40 with filter 44 similar to the response of a human eye. This may prevent problems like darkening of electro-optic element 20 in response to infrared light (that is not perceived by a human eye). Filter 44 may also be configured to minimize the leakage of light coming from different angles. Typical filters have a strong dependence on an angle of incidence of light. Increasing the blocking range of the filter 44 and adding more complexity in the form of more layers may keep leakage of light to a minimum at high angles of incidence.

Figure 4:
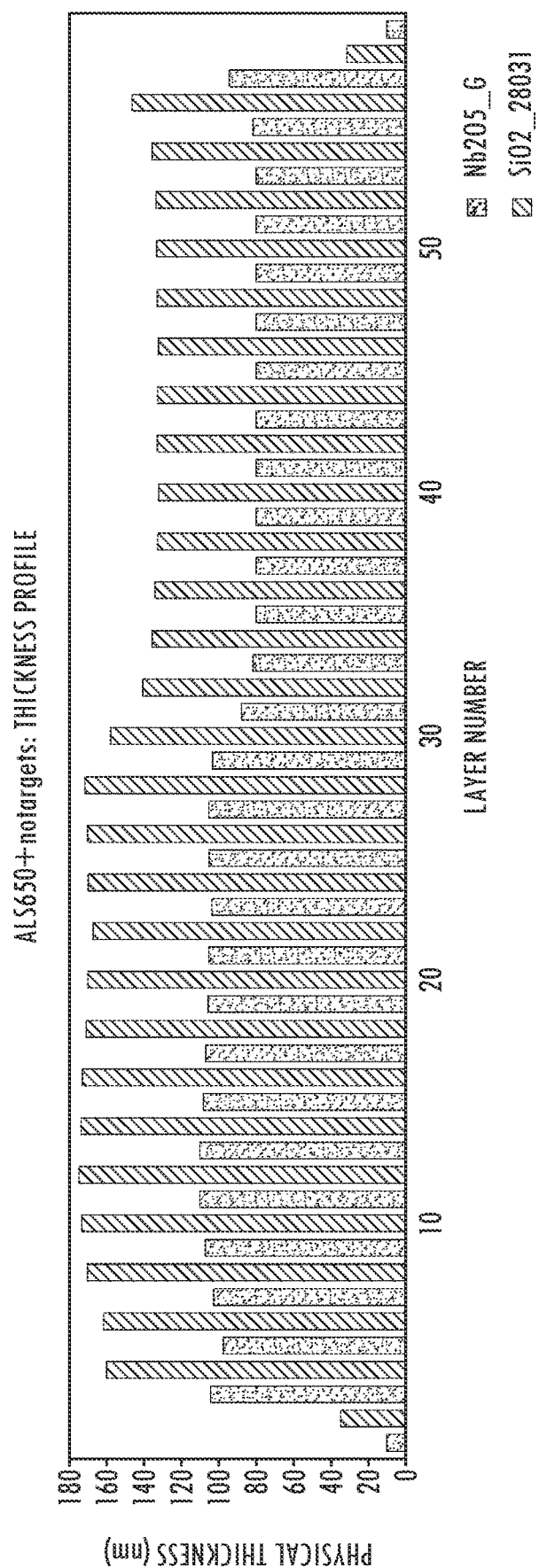
FIG. 4 illustrates a graph illustrating thicknesses of the filter layers in an embodiment of this disclosure.

Filter 44 may comprise a dichroic filter having a plurality of layers, as shown in FIG. 4. In one example, filter 44 may include layers of a material having a high refractive index, such as $Nb_2O_5$ (niobium oxide) alternating with layers of a material having a low refractive index such as $SiO_2$ (silicon dioxide). For example, filter 44 may comprise at least 40 layers, at least 50 layers, 51 layers, 52 layers, 53 layers, 54 layers, 55 layers, 56 layers, 57 layers, 58 layers, 59 layers, 60 layers, 61 layers, 62 layers, 63 layers, 64 layers, or 65 layers. The outer layers of filter 44 may be thinner than the inner layers of filter 44. In a further example, except for the outer four to six layers (two to three on each end of filter), the layers of low refractive index material may be thicker than the layers of high refractive index material.

Filter 44 may have two or more sections, each section having generally different thicknesses of at least one of the high or low density materials. For example, filter 44 may have a first section in which the thicknesses of the layers of the low refractive index material may be between about between about 150 and 190 nm, between about 155 and 185 nm, between about 160 and 180 nm. Continuing the example, the thicknesses of the layers of the high refractive index material may be between about 85 and 120 nm, between 90 and 115 nm, between about 95 and 110 nm. Further continuing the example, filter 44 may have a second section in which the thicknesses of the layers of the low refractive index material are between about 120 and 160 nm, between about 125 and 155 nm, between about 130 and 150 nm and the thicknesses of the high refractive index material are between about 65 and 105 nm, between about 70 and 100 nm, between about 75 and 95 nm. Each of the two or more different sections may be configured to block a different range of wavelengths of light. The thickness of the layers of filter 44 may determine the wavelengths that are blocked by filter 44. It may be desirable to configure filter 44 to block wavelengths above 650 nm and/or below 400 nm.

Glare sensor 40 may be positioned to detect glare from a field of view generally behind the vehicle. Glare sensor 40 may be configured to produce a glare signal indicating the amount of glare incident on glare sensor 40 and to transmit glare signal to processor 24. In some embodiments, glare sensor 40 may be placed behind EO element 20 so that the light incident on glare sensor 40 travels through EO element 20 prior to reaching glare sensor 40.

EO element 20 may include an aperture 42 allowing light to pass through EO element 20 to glare sensor 40. A sensor cover (not shown) may be positioned within the EO element 20 and be operable to cover glare sensor 40.

Processor 24 may be configured to receive glare signal and to determine the level of glare. Processor 24 may further be configured to output a control signal to controller 28, wherein the control signal is based, at least in part, on the glare signal received from glare sensor 40.

Processor 24 may be a general or application specific processor 24 or circuit for performing calculations, handling inputs, generating outputs, and/or otherwise performing computational tasks. Processor 24 may be used to analyze the data collected by ambient light sensor 32 and/or glare sensor 40. Processor 24 may be in communication with and configured to transmit inputs to controller 28. Processor 24 may be disposed on a printed circuit board 54.

A memory 56 may be in communication with processor 24 and may be utilized to store information regarding electrical voltages to be applied to EO element 20 based on various inputs such as the level of glare to control dimming of EO element 20. In general, as EO element 20 is electrically energized, it darkens and begins to absorb light. As the voltage applied to EO element 20 increases (up to a maximum limit), the mirror becomes darker. When the electrical voltage is removed, the mirror returns to its clear state. Memory 56 may be used to facilitate the functions of EO element 20. Memory 56 may be volatile and/or non-volatile memory. Memory 56 may be random access memory, read only memory, flash memory, hard disk storage, flash memory storage, solid state drive memory, and the like.

Based on inputs received from the at least one glare sensor 40, processor 24 may determine whether glare is detected on EO element 20. Glare may be determined based on a ratio of ambient light (detected by forward facing ambient light sensor) to light striking rearview assembly 10, such as headlamp light from a trailing vehicle (detected by rear facing sensor). If processor 24 determines that glare above a predetermined threshold glare level is reaching EO element 20, processor 24 may communicate with controller 28. Controller 28 may be configured to, upon receipt of the control signal from processor 24, determine whether the glare level falls within predetermined parameters which would make it desirable for EO element 20 to dim and, if so, to determine the desired amount of dimming. If the signal does fall within the predetermined parameters, controller 28 may cause EO element 20 to dim the desired amount to reduce the glare while still allowing the vehicle operator to see reflected images in rearview assembly 10. In various embodiments, the at least one glare sensor 40 may be disposed in front of or behind EO element 20, and the glare sensing may be done before, during, or after the light which causes the glare is attenuated by EO element 20.

As EO element 20 darkens, reflectance may change from a maximum reflectance, for example, a reflectance of approximately 85 percent, down to a minimum amount of reflectance, for example, a reflectance of approximately 6 percent, the amount of dimming depending on how much glare is sensed by glare sensor 40. Higher levels of glare may cause controller 28 to cause EO element 20 to get darker. With only small amounts of glare, the mirror dims only partially while with bright blinding glare, the mirror dims to a fully dark condition, allowing a reflectance of about six percent.

Figure 5:
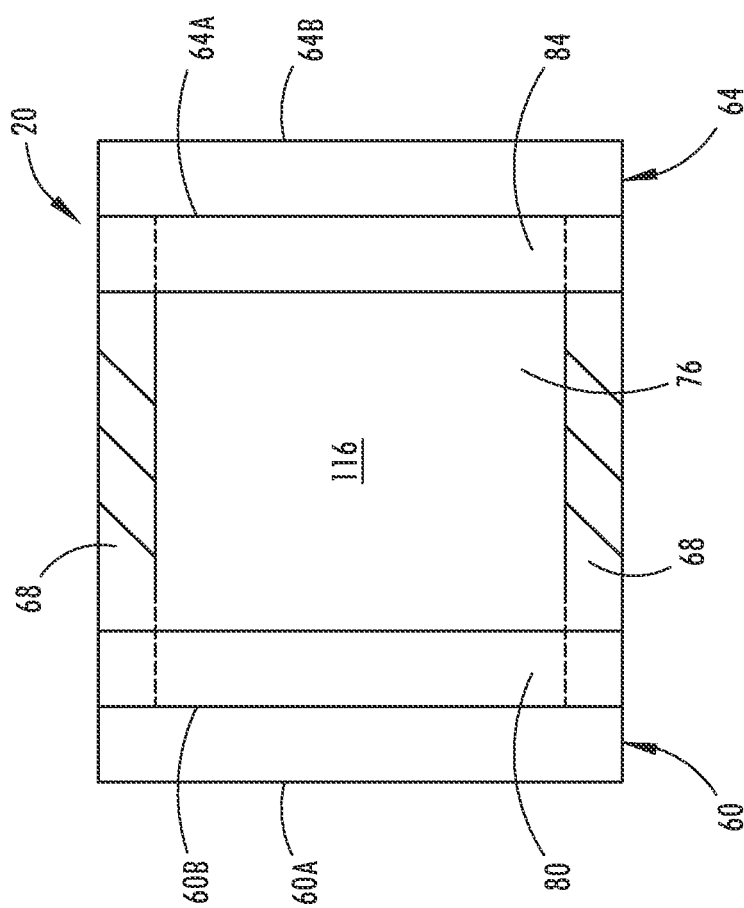
FIG. 5 is a schematic diagram of an EO element.

FIG. 5 shows a schematic representation of EO element 20. EO element 20 generally comprises a first substrate 60 having a first surface 60A and a second surface 60B, and a second substrate 64 having a first surface 64A and a fourth surface 64B. A sealing member 68 may extend between first and second substrates 60, 64 along at least a portion of a perimeter of EO element 20. A chamber 72 for containing electro-optic medium 76 may be defined by second surface 60B of first substrate 60, the opposed first surface 64A of second substrate 64, and sealing member 68. As shown in the figures, first substrate 60 may be closer to the viewer than second substrate 64.

One or more layers of electrically conductive material or electrode coatings 80 may be associated with rear surface 60B of first substrate 60. These layers may serve as a first electrode for electro-optic device 20. Similarly, one or more layers of electrically conductive material or electrode coatings 84 may be associated with and disposed on front surface 64A of second substrate 64 and may operate as a second electrode for electro-optic device 20. Electrode coating 80 may be a material that: (a) is substantially transparent in the visible region of the electromagnetic spectrum; (b) bonds reasonably well to first substrate 60; (c) maintains this bond when associated with a sealing member; (d) is generally resistant to corrosion from materials contained within electro-optic device 20 or the atmosphere; and (e) exhibits minimal diffusion or specular reflectance as well as sufficient electrical conductance. Electrode coating 80 may be fabricated from fluorine doped tin oxide (FTO), indium/tin oxide (ITO), doped zinc oxide or other materials known to those having ordinary skill in the art.

The above description is considered that of the preferred embodiments only. Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

In this document, relational terms, such as first and second, top and bottom, front and back, left and right, vertical, horizontal, and the like, are used solely to distinguish one entity or action from another entity or action, without necessarily requiring or implying any actual such relationship, order, or number of such entities or actions. These terms are not meant to limit the element which they describe, as the various elements may be oriented differently in various applications. Furthermore, it is to be understood that the device may assume various orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

It will be understood that any described processes or steps within described processes may be combined with other disclosed processes or steps to form structures within the scope of the present disclosure. The exemplary processes disclosed herein are for illustrative purposes and are not to be construed as limiting. It is also to be understood that variations and modifications can be made on the aforementioned methods without departing from the concepts of the present disclosure, and further it is to be understood that such concepts are intended to be covered by the following claims unless these claims by their language expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within at least one of 2% of each other, 5% of each other, and 10% of each other.

The invention claimed is:

1. A rearview system comprising:
    a light sensor assembly having:
        a photosensor operable to detect light and generate a signal based, at least in part, on the detected light;
        a dichroic filter in optical communication with the photosensor and operable to filter light, the dichroic filter configured to substantially inhibit light having a wavelength of greater than a predetermined wavelength from transmitting therethrough, wherein the dichroic filter comprises a plurality of filter layers, the dichroic filter being configured to generate sensor responses in the photosensor similar to the response of a human eye; and
    a rearview assembly having an electro-optic element comprising an electro-optic medium and operable to variably change the amount of light passing through the electro-optic medium based, at least in part, on the signal,
    wherein the dichroic filter comprises a first portion comprising a plurality of filter layers and capable of substantially inhibiting the passage of light having a wavelength of greater than 650 nm through the dichroic filter and a second portion comprising a plurality of filter layers and capable of substantially inhibiting the passage of light having a wavelength of less than 400 nm through the dichroic filter.

2. The rearview system of claim 1, wherein the filter layers comprise a plurality of layers of a material having a high refractive index and a plurality of layers of a material having a low refractive index, lower than the refractive index of the material having the high refractive index.

3. The rearview system of claim 2, wherein the filter layers having the high refractive index comprise niobium oxide, and wherein the filter layers having the low refractive index comprise silicon dioxide and wherein the niobium oxide layers alternate with the silicon dioxide layers.

4. The rearview system of claim 2, wherein the dichroic filter comprises at least 50 layers, wherein at least 25 of the filter layers are layers of the material having a high refractive index and at least 25 of the layers are of the material having the low refractive index.

5. The rearview system of claim 4, wherein the dichroic filter comprises fewer than 65 layers.

6. The rearview system of claim 2, wherein the first range and the second range are at least partially outside the visible light spectrum.

7. The rearview system of claim 2, wherein the filter is configured to attenuate certain portions of the spectrum that include portions of at least one of the visible light, infrared light, and ultraviolet portions of the spectrum.

8. The rearview system of claim 1, wherein the filter is disposed between the photosensor and the light.

9. The rearview system of claim 1, wherein the filter is disposed on a surface of the photosensor such that light must pass through the filter prior to reaching the photosensor.

10. The rearview system of claim 1, wherein the filter is incorporated with the photosensor.

11. The rearview system of claim 1, wherein the filter is a freestanding filter disposed in a path between the light and the photosensor, and wherein light would pass through the filter prior to reaching the photosensor.

12. The rearview system of claim 1, wherein the filter may be disposed on a coated substrate in proximity to the photosensor.

13. The rearview system of claim 1, wherein the filter is configured to transmit light in the spectral range of human vision and to reduce or block light outside the spectral range of human vision.

14. The rearview system of claim 1, wherein the filter is configured to minimize the leakage of light coming from certain angles.

\* \* \* \* \*